US012704065B2

(12) United States Patent
Gunasekara et al.

(10) Patent No.: US 12,704,065 B2
(45) Date of Patent: Aug. 11, 2026

(54) APPARATUS FOR RETRIEVING DEEP-SEA NODULES

(71) Applicant: Impossible Metals Inc., San Jose, CA (US)

(72) Inventors: Oliver Gunasekara, San Jose, CA (US); Jason Gillham, San Jose, CA (US)

(73) Assignee: Impossible Metals Inc., San Jose, CA (US)

(*) Notice: Subject to any disclaimer, the term of this patent is extended or adjusted under 35 U.S.C. 154(b) by 414 days.

(21) Appl. No.: 18/190,794

(22) Filed: Mar. 27, 2023

(65) Prior Publication Data

US 2023/0304402 A1 Sep. 28, 2023

Related U.S. Application Data

(60) Provisional application No. 63/323,979, filed on Mar. 25, 2022.

(51) Int. Cl.

*E21C 50/00* (2006.01)
*B25J 5/00* (2006.01)
(Continued)

(52) U.S. Cl.

CPC ................ *E21C 50/00* (2013.01); *B25J 5/00* (2013.01); *B63G 8/001* (2013.01); *B63G 8/38* (2013.01);
(Continued)

(58) Field of Classification Search

CPC ... B25J 5/00; B25J 9/003; B25J 15/00; B63G 8/001; B63G 8/38; B63G 2008/004; E21C 2200/00; E21C 50/00
See application file for complete search history.

(56) References Cited

U.S. PATENT DOCUMENTS 5,039,254 A 8/1991 Piercy
2013/0106127 A1 5/2013 Lipson et al.
(Continued)

FOREIGN PATENT DOCUMENTS

CN 105804755 A 7/2016
CN 106239482 A * 12/2016 ............ B25J 9/0072
(Continued)

OTHER PUBLICATIONS

Meng, Zhaoran & Cao, Wen-Ao & Ding, Huafeng & Chen, Ziming. (2022). A new six degree-of-freedom parallel robot with three limbs for high-speed operations. Mechanism and Machine Theory. 173. 104875. 10.1016/j.mechmachtheory.2022.104875. (Year: 2022).*
(Continued)

*Primary Examiner* — Theodore N Yao
(74) *Attorney, Agent, or Firm* — Foley & Lardner LLP

(57) ABSTRACT

A deep-sea mining apparatus for retrieving deep-sea nodules is provided. The deep-sea mining apparatus includes a buoyancy system, a payload hopper, an underwater autonomous vehicle (UAV), and a collector system. The collector system includes a controller system and a perception system communicatively coupled to the controller system and configured to track the deep-sea mining system as the deep-sea mining system hovers over ore nodules laying on a seabed. The collector system further includes one or more robotic arms controlled via the controller system, wherein each of the one or more robotic arms is attached to a bottom surface of the UAV and is equipped with a grasping mechanism configured to pick up the ore nodules from the seabed.

19 Claims, 5 Drawing Sheets

(51) Int. Cl.

| | |
|---|---|
| ***B63G 8/00*** | (2006.01) |
| ***B63G 8/38*** | (2006.01) |
| *B25J 9/00* | (2006.01) |
| *B25J 15/00* | (2006.01) |

(52) U.S. Cl.

CPC ................ *B25J 9/003* (2013.01); *B25J 15/00* (2013.01); *B63G 2008/004* (2013.01); *E21C 2200/00* (2023.05)

(56) References Cited

U.S. PATENT DOCUMENTS

| | | | | |
|---|---|---|---|---|
| 2019/0202554 | A1* | 7/2019 | Bosworth | B64U 30/20 |
| 2022/0145756 | A1 | 5/2022 | Vagata et al. | |

FOREIGN PATENT DOCUMENTS

| | | | | | |
|---|---|---|---|---|---|
| CN | 109878669 | A | | 6/2019 | |
| CN | 113338939 | A | | 9/2021 | |
| CN | 113374479 | A | | 9/2021 | |
| NL | 2016225 | B1 | * | 8/2017 | B63G 8/001 |
| WO | WO-2023063831 | A1 | * | 4/2023 | B63G 8/001 |

OTHER PUBLICATIONS

Gómez-Paccapelo, J.M., Santarossa, A.A., Bustos, H.D. et al. Effect of the granular material on the maximum holding force of a granular gripper. Granular Matter 23, 4 (2021). https://doi.org/10.1007/s10035-020-01069-z (Year: 2021).*

Götz, H., Santarossa, A., Sack, A. et al. Soft particles reinforce robotic grippers: robotic grippers based on granular jamming of soft particles. Granular Matter 24, 31 (2022). https://doi.org/10.1007/s10035-021-01193-4 (Year: 2021).*

Licht, S., Collins, E., Badlissi, G., Rizzo, D.: A partially filled jamming gripper for underwater recovery of objects resting on soft surfaces. In: 2018 IEEE/RSJ International Conference on Intelligent Robots and Systems (IROS), pp. 6461-6468 (2018). https://doi.org/10.1109/IROS.2018.8593361 (Year: 2018).*

International Search Report and Written Opinion for International Patent Application No. PCT/US2023/016441, dated Jun. 16, 2023 (9 pages).

Al-Naimi Ibrahim et al: "Fully-Automated Parallel-Kinematic Robot for Multitask Industrial Operations".

Alevizos Evangelos: "Examination of the Spatial Resolution and Discrimination Capability of Various Acoustic Seafloor Classification Techniques Based On Mees Backscatter Data".

European Supplementary Search Report of Nov. 19, 2025, issued in European Application No. EP 23775765 (3 pages).

* cited by examiner

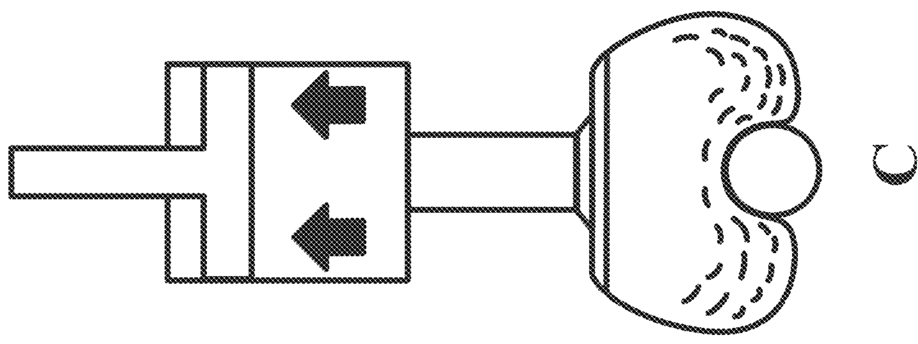
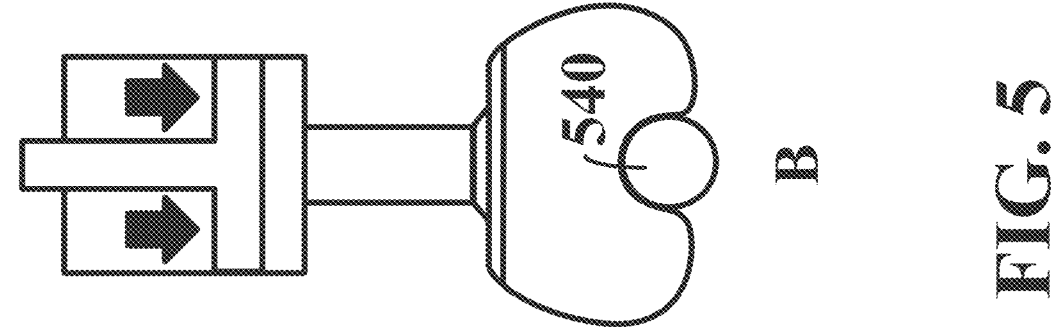
FIG. 5
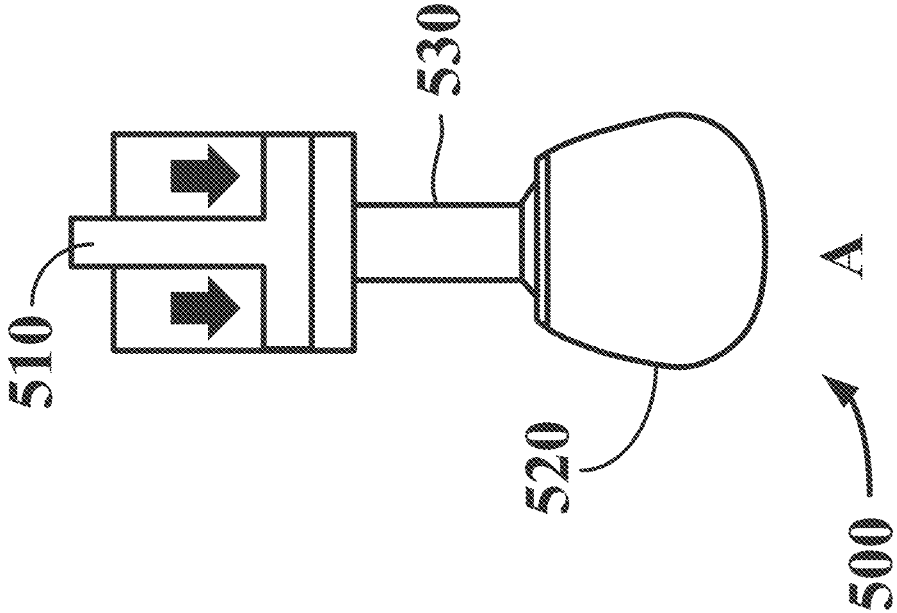

APPARATUS FOR RETRIEVING DEEP-SEA NODULES

CROSS-REFERENCE TO RELATED APPLICATION

This application claims the benefit of U.S. Provisional Patent Application No. 63/323,979, titled "METHOD AND APPARATUS FOR RETRIEVING DEEP-SEA NODULES," which was filed on Mar. 25, 2022 and is incorporated herein by reference in its entirety.

FIELD OF TECHNOLOGY

The present disclosure relates generally to deep-sea mining systems and more specifically to deep-sea mining systems with underwater robotic arms having appropriate end effectors suitable for deep-sea mining. The disclosed underwater robotic arms via their end effectors may collect ore nodules with minimal disturbance to the seabed ecosystem.

BACKGROUND

As the world transitions to green energy solutions, there is a growing demand to store energy in reusable batteries made from critical metals such as nickel, copper, and cobalt. Currently, there are fewer sources of these metals remaining on land and these land-based resources can be in challenging places and/or within sensitive ecosystems. Deep sea mining is an un-tapped source of critical metals in the form of ore nodules (e.g., polymetallic ferromanganese nodules) and has been the focus of the mining industry in recent years.

Technical difficulties associated with deep-sea mining include the ocean depths (e.g., 5 km to 6 km) and the extreme pressures (e.g., between 500 bar and 600 bar) at which the mining of the ore nodules occurs, and the techniques required to transport the mined ore up to the ocean surface. There are two systems that have been widely examined and determined feasible on a small scale: (i) seabed dredging collector systems that pump the ore to the surface as a slurry through vertical riser pipes, and (ii) mechanical lifting systems that use synthetic ropes. However, both systems suffer from reliability and scaling issues, and can cause irreparable damage to sensitive environments due to the disturbances caused on the seabed during the mining process.

Additionally, existing underwater robotic arms, which are designed primarily for slow speed and high strength operations, are lacking qualities and functionality that is desirable for deep sea mining operations—such as ore nodule collection from the seabed. For example, existing underwater robotic arms, which are most commonly used in offshore oil and gas construction operations, are electrically or hydraulically controlled and have joint actuators that move together with the arm. Consequently, the arm exhibits high drag coefficient in water and has fewer degrees of freedom because its movement is constrained by the orientation of its actuators. This means that these arms may be unable to change their orientation quickly, if at all, during ore collection. Accordingly, there is a need for a robotic arm with increased degrees of freedom and suitable end effects that would allow the robotic arm to collect ore nodules quickly without disturbing the seabed environment.

SUMMARY

A deep-sea mining system that retrieves nodules using a modular collector system that includes robotic arms equipped with suitable end effectors and methods for using the same are disclosed herein. According to some embodiments, the disclosed modular collector system includes a controller, a perception system, and one or more robotic arms with an end effector grasping mechanism attached to each robotic arm. In some embodiments, each robotic arm can be a delta robot capable of moving in at least three dimensions (e.g., in six dimensions) while the end effector grasping mechanism can be either a universal gripper or a claw. In further embodiments, the perception system may use computer vision segmentation and stereoscopic localization processes to calculate the movement of the robotic arms during the nodule collection process. In some embodiments, the perception system is configured to identify nodules with macro fauna and classify the nodules accordingly so that nodules without macro fauna are collected and nodules with macro fauna are not collected. Accordingly, the disclosed deep-sea mining system is able to collect nodules with minimal impact on the seabed ecosystem.

BRIEF DESCRIPTION OF THE DRAWINGS

The accompanying figures, which are included as part of the present specification, illustrate the presently preferred embodiments and together with the general description given above and the detailed description of the preferred embodiments given below serve to explain and teach the principles described herein.

FIG. 5 illustrates the operation of a universal gripper, in accordance with some embodiments.

DETAILED DESCRIPTION

Figure 1:
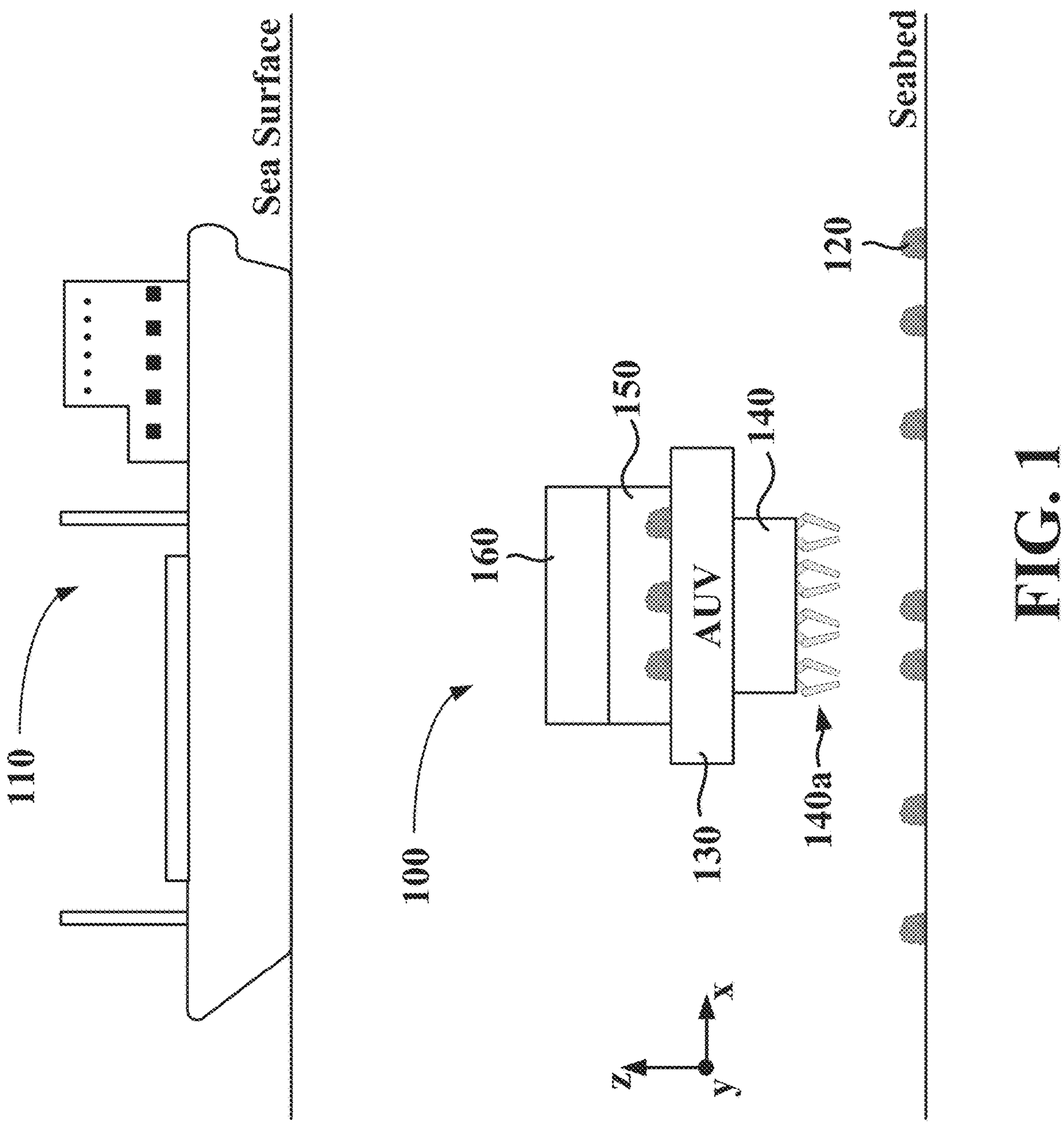
FIG. 1 illustrates an exemplary deep-sea mining system, in accordance with some embodiments.

FIG. 1 illustrates an exemplary deep-sea mining system 100 deployed from a mining ship 110 to collect ore nodules 120 disposed on the seabed, according to some embodiments. Deep-sea mining system 100 descents at the vicinity of the seabed and hovers over the seabed during the ore collection process. In some embodiments, deep-sea mining system 100 includes an underwater autonomous vehicle (UAV) 130, an ore collector system 140 that collects ore nodules 120 form the seabed, a payload hopper 150 for temporarily storing the collected ores, and a dynamic buoyancy system 160 that enables the deep-sea mining system 100 to maneuver primarily in a vertical direction (e.g., to descend from the sea surface to the seabed and ascend from the seabed to the sea surface).

According to some embodiments, UAV 130 is equipped with thrusters (not shown in FIG. 1) that enable deep-sea mining system 100 to maneuver primarily in a lateral direction (e.g., parallel to the seabed—along the x-y plane) and secondarily in the vertical direction (e.g., along the z-direction). By way of example and not limitation, ore collector system 140 is equipped with robotic arms **140*a* that may extend towards the seabed and reach for the ore nodules. In some embodiments, the robotic arms 140*a* can harvest the ore nodules by picking them up as the deep-sea mining system 100 hovers over the seabed using appropriate end effectors not shown in FIG. 1. Once picked up, the ore nodules can be disposed into payload hopper 150**.

According to some embodiments, deep-sea mining system 100 uses underwater surveying and inspection systems to identify the position of the ore nodules 120 on the seabed and to determine whether marine life is anchored on the nodules. By way of example and not limitation, deep-sea mining system 100 may be configured to avoid collecting ore nodules having marine life anchored on them. Once the payload hoper 150 is full, the dynamic buoyancy system 160 enables the deep-sea mining system 100 to ascent to the sea surface and deliver its payload.

According to some embodiments, the components of deep-sea mining system 100 (e.g., dynamic buoyancy system 160, payload hopper 150, ore collector system 140, and UAV 130) operate in synergy. In some embodiments, these components may be either integrated in a housing or operated as detachable modules physically and communicatively connected to one another. According to some embodiments, dynamic buoyancy system 160, payload hopper 150, ore collector system 140, and UAV 130 are physically attached to one another during the collection/mining process, and at least the payload hopper 150 and the dynamic buoyancy system 160 can be physically attached to one another during the mining and ascending process. In some embodiments, the dynamic buoyancy system 160 can provide the necessary buoyancy to compensate for the collected ores during the mining process and the ascent of at least the payload hopper 150 or of the entire deep-sea mining system 100. In some embodiments, if the dynamic buoyancy system 160 and the payload hopper 150 ascent on their own to the ocean surface, UAV 130 may provide with its thrusters the necessary buoyancy to deep-sea mining system 100 until the dynamic buoyancy system 160 and the payload hopper 150 descend again from the sea surface to re-attach to the deep-sea mining system 100.

In some embodiments, deep-sea mining system 100 can include additional components, modules, and systems necessary for its operation. These additional components, modules, and systems are not shown in FIG. 1 for simplicity. By way of example and not limitation, these additional components, modules, and systems may include cables, one or more onboard computers, electronic equipment, additional thrusters, motors, batteries, communication equipment, cameras, radars, controllers, global positioning systems, and the like. These additional components, modules, and systems are within the limit and the scope of this disclosure. In some embodiments, deep-sea mining system 100 may operate under autonomous mode, semi-automatic mode, manual mode, or combinations thereof based on instructions from mining ship 110. In yet another embodiment, deep-sea mining system 100 may be communicatively coupled and physically connected to mining ship 110 via ropes, cables, and the like.

The Collector System

Figure 2:
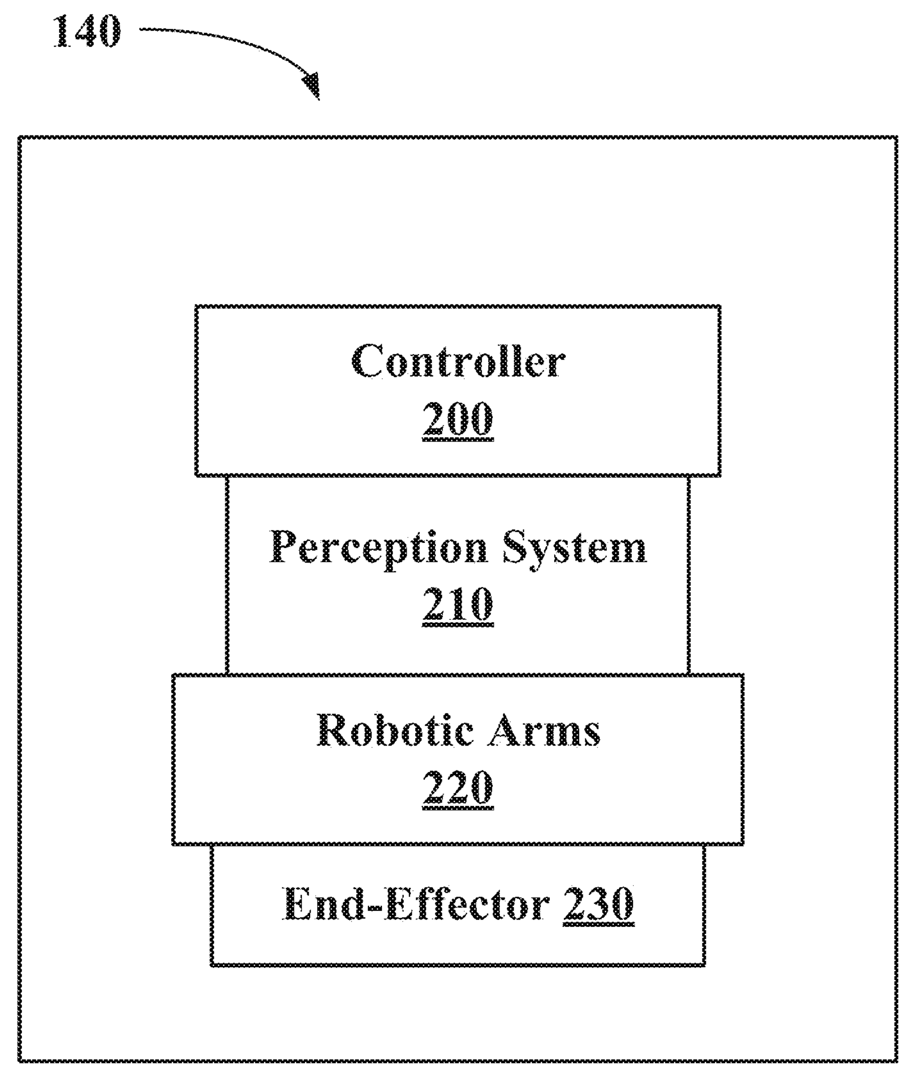
FIG. 2 illustrates a collector system, in accordance with some embodiments.

According to some embodiments, FIG. 2 shows the salient modules of the collector system 140 shown in FIG. 1. As shown in FIG. 2, collector system 140 is a modular system that includes a controller 200, a perception system 210, one or more robotic arms 220 (e.g., similar to the robotic arms 140*a* depicted in FIG. 1), and an end effector grasping mechanism 230 for each of the one or more robotic arms 220. By way of example and not limitation, the end effector grasping mechanism 230 can be a claw, a universal gripper, or any mechanism suitable for deep mining. According to some embodiments, the fixed end of the one or more robotic arms 220 is securely attached to the bottom surface of the UAV 130, as depicted in the example of FIG. 1. As discussed above, UAV 130 hovers above the seabed so that it does not contact the seabed.

The Controller

According to some embodiments, the controller 200 shown in FIG. 2 processes the perception data from perception system 210 to locate the ore nodules on the seabed with respect to the fixed end of the robotic arms 220. In some embodiments, controller 200 can be a single board computer with a processor, such as an Intel i7 processor. However, this is not limiting and other suitable processors may be used.

Because the communication between the ship and the deep-sea mining system 100 can be limited, all the operations of deep-sea mining system 100 can be autonomous, according to some embodiments. Accordingly, processing of information occurs on board the deep-sea mining system 100. By way of example and not limitation, the operating system running on controller 200 can be Ubuntu and the processes can be executed using Python leveraging a Robot Operating System (ROS) framework from the Open Source Robotics Foundation. ROS is a collection of software frameworks for robot software development that provides services designed for a heterogeneous computer cluster, such as hardware abstraction, low-level device control, implementation of commonly used functionality, message-passing between processes, and package management. Running sets of ROS-based processes are represented in a graph architecture where processing occurs in nodes that may receive, post, and multiplex sensor data.

Robotic Arms

Figure 3:
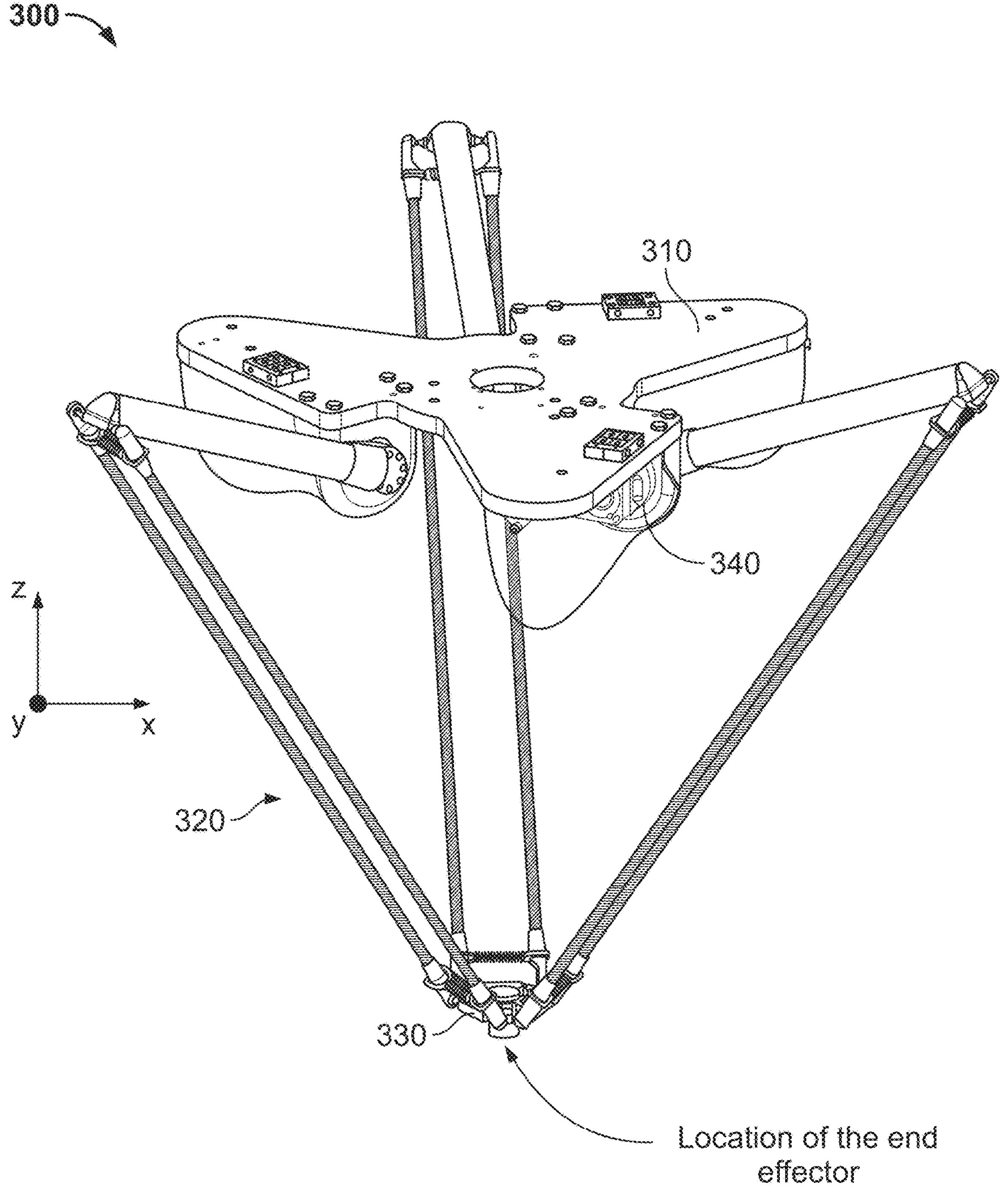
FIG. 3 illustrates an exemplary delta robot, in accordance with some embodiments.

In some embodiments, the one or more robotic arms 220 can be a delta robot capable of moving in at least three dimensions (e.g., in six dimensions) when equipped with additional arms and suitable rotational motors. FIG. 3 shows an exemplary delta robot 300 that can move in six dimensions. The delta robot 300 of FIG. 3 can be sized so that one or more delta robots can be attach by their base 310 to the bottom surface of the UAV 130, as shown in FIG. 1. The delta robot shown in FIG. 3, is a parallel robot—i.e., it consists of multiple kinematic chains or jointed arms 320 connecting its base 310 to a small triangular platform 330 on which the end effector can be attached. In some embodiments, the end effector is attached to the triangular platform 330 and/or replaces the triangular platform 330 shown in FIG. 3.

In some embodiments, the actuators of the delta robot 300 are located on its base 310 from which three jointed arms 320 extend towards the working surface (e.g., the seabed). Actuation of the three jointed arms 320 moves the triangular platform 330 (and/or the end effector when attached to it) along the x, y, or z direction. In some embodiments, actuation of the three jointed arms 320 is achieved with linear or rotational actuators 340, with or without reductions (e.g., via direct drive). Since the actuators 340 are all disposed on the base 310, the jointed arms 320 can be made of a light-weight composite material. Consequently, the moving parts of the delta robot 300 exhibit small inertia, which allows the jointed arms 320 to move with precision at high speeds and achieve high accelerations. Although, having all the jointed arms 320 connected together to the triangular platform 330 increases the robot's stiffness, this configuration may limit the robot's working volume, which is the cumulative 3D space that the end effector connected to the platform 330 can be positioned given the permutations of angles allowable by motors 340. By way of example and not limitation, the motors 340 driving the jointed arms 320 can be BMU and BLE2 series motors made by Oriental Motor USA Corp. which are suitable for underwater operation.

Because the jointed arms 320 of delta robot 300 (or other loop-style robotic arms) do not require electronic or hydraulic actuation along the length of the arm, they exhibit a low drag coefficient in the water and low inertia. Accordingly, delta robots, like delta robot 300, or other loop-style robotic arms, can be suitable for high speed underwater operation.

The Perception System

Perception system 210 may be located at the leading edge of the deep-sea mining system 100 proximal to the seabed. The purpose of perception system 210 is to identify the targets of interest (e.g., the polymetallic ore nodules 120) on the seabed and map their location from the perception system's reference frame to a global reference frame. Further, perception system 210 is configured to track the motion of the deep-sea mining system 100 to maintain an understanding of the position of the target object in the reference frame of robotic arms 220.

According to some embodiments, perception system 210 may include a single or multiple cameras combined with a structured and/or unstructured illumination system. Exemplary cameras for perception system 210 may include Intel Realsense D435i cameras. In further embodiments, perception system 210 may also include a sonar system.

According to some embodiments, perception system 210 may use computer vision segmentation and stereoscopic localization processes, which can account for refraction through the air/glass and glass/water interfaces, to map the ore nodules on the seabed. Additionally, the perception system 210 may track the motion of deep-sea mining system 100 through a combination of acoustic positioning, doppler velocity, log velocity measurements, and velocity measurements via an optical flow processes from the camera system.

According to some embodiments, and while the deep-sea mining system 100 travels, each robotic arm's movement towards its target is calculated and optimized before the robotic arms 220 are deployed to collect the ore nodules. In some embodiments, the movement of the robotic arms 220 is based on inverse kinematics so that the distal end of the last arm segment or the end-reflector is at the desired location in the three-dimensional (3D) space.

In some embodiments, the controller 200 implements a "travelling salesperson" problem to calculate for each robotic arm the fastest path through a number of stop points. This method can be expanded to include multiple "sales people" since the deep-sea mining system 100 can have multiple robotic arms that could pick up any one nodule but not all arms could pick up all nodules.

Figure 4:
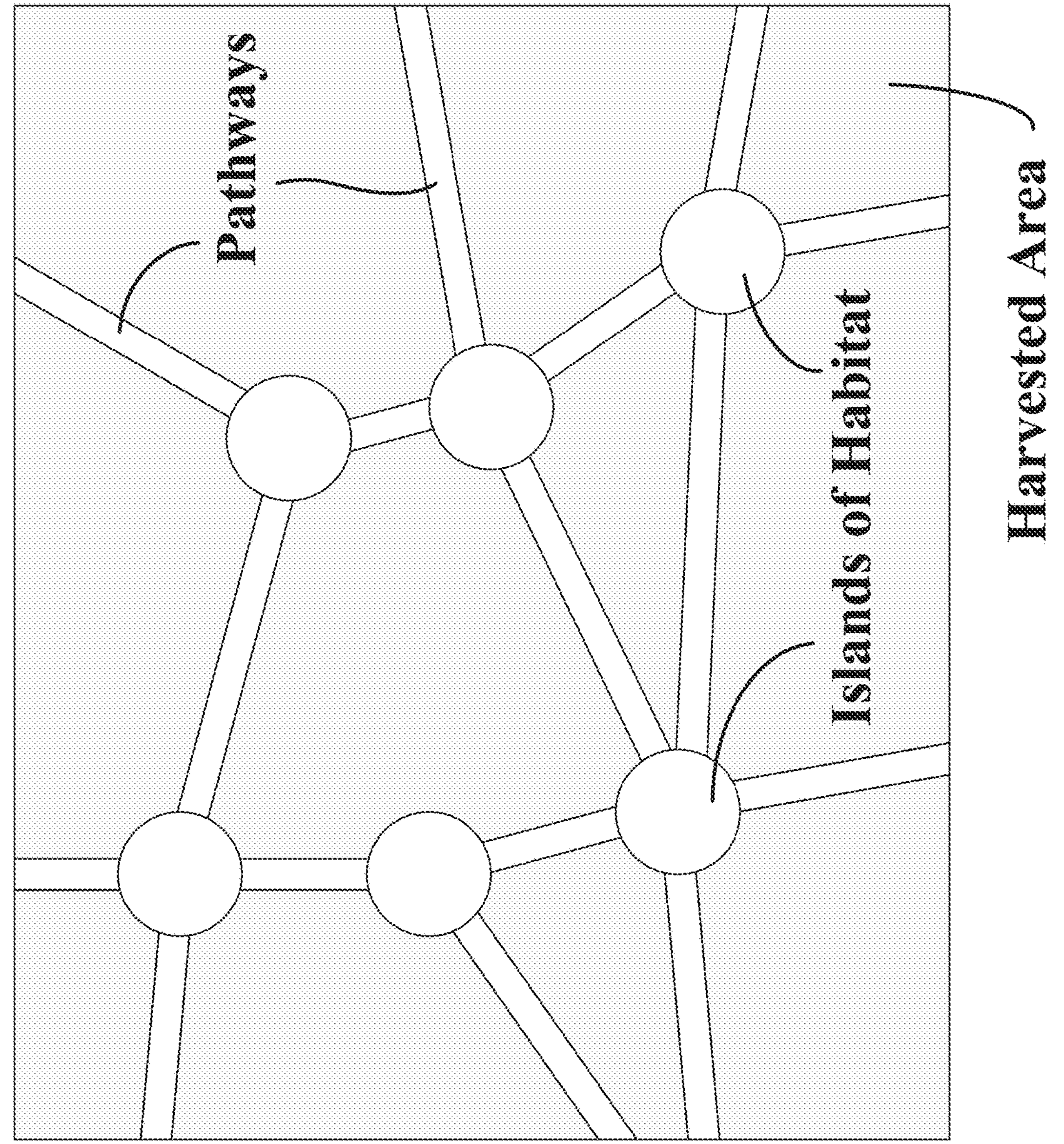
FIG. 4 illustrates nodule collection pattern, in accordance with some embodiments.

According to some embodiments, perception system 210 is configured to identify nodules with macro fauna thereon and classify the nodules accordingly so that nodules without macro fauna are collected and nodules with macro fauna are not collected. In some examples, collector system 140 can collect nodules in patterns to allow pathways or corridors for the migration of the macro fauna between the remaining (e.g., non-collected) nodules. By way of example and not limitation, such a pattern can be islands of habitat with connecting pathways or corridors between the islands, as shown in FIG. 4 where the non-harvested areas (e.g., the islands of habitat with the connecting pathways or corridors) are colored white and the harvested areas are colored gray. In further embodiments, the collector system 140 can be configured to collect nodules having sizes within a desired range (e.g., between 5 cm and 10 cm in diameter) while excluding or rejecting nodules with sizes outside the desired range. Additionally, collector system 140 may record images to ensure that the impact on the seabed ecosystem is minimal.

The End Effector

When the end effector is at the desired location, it can be actuated or disengaged to grasp or release the polymetallic nodules (e.g., the ores). According to some embodiments, the end effector can be a claw or a universal gripper. An exemplary universal gripper 500 is shown in FIG. 5. Universal gripper 500 consists of a chamber with a piston 510 that forces an incompressible fluid, such as oil or water, in and out a flexible bladder 520 through a hose or other connection vessel 530. According to some embodiments, the flexible bladder 520 can be made from a material that has the appearance and structure of an inflatable balloon. According to some embodiments, the flexible bladder 520 can be fabricated from any waterproof material with the desired elasticity.

The flexible bladder 520, whose upper half is restrained and lower half is unrestricted, contains small granules (e.g., small spheres). When the flexible bladder 520 is inflated (i.e., filled with the incompressible fluid), as shown in position A, the small granules can move freely past each other as they are not fully constrained. At this inflate state, the flexible bladder 520 can be positioned over an object 540 (e.g., an ore nodule), as shown in position B, so that a bottom portion of the flexible bladder can conform around object 540. Once in this position, piston 510 moves upwards to drive the incompressible fluid out of the flexible bladder 520, as shown in position C. The upward movement of piston 510 deflates the flexible bladder 520 and forces the small granules together. As a result, the small granules become fully constrained, interlock together, and remain in the locked shape until the flexible bladder 520 is again inflated.

Although the granules are small in size (e.g., 1 mm in diameter), they are weighted so that they do not flow with the incompressible liquid out of the flexible bladder 510. That is to say, the granules are substantially heavier than the incompressible liquid. Further, the size and weight of the granulates is selected such that the flexible bladder 520 can conform around a substantial portion of the object 540 (e.g., the ore nodule of desirable size). By way of example and not limitation, the granules can be 1 mm in diameter steel ball bearings.

As shown in FIG. 5, the flexible bladder 520 (e.g., the end effector) transitions between two states, inflated (as shown in A and B) and locked (as shown in C). When inflated, the internal granules are free to move about within the boundaries of flexible bladder 520. Accordingly, the bottom of the flexible bladder 520 can be pushed onto object 540 and take its shape as the granules move around the object's (e.g., the nodule's) perimeter. Subsequently, the incompressible fluid is drawn from the flexible bladder 520, interlocking the granules in place, and locking the object within the granule matrix. In some embodiments, the granule matrix refers to the relative positioning of the granules when maximum packing density is achieved. For example, in a granulate matrix, the granules are positioned in sphere packing arrangement where each granule is nested among six neighboring granules so that it contacts three neighboring granules from one side and three neighboring granules from another side.

According to some embodiments, the universal gripper is capable of grasping onto objects with minimal exposed surface. Further, by limiting the contact surface between the end effector and the upper portion of the nodule (e.g., either with the universal gripper 500 or alternatively with the claw gripper), disturbances to the seabed can be avoided.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of" "only one of" or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A collector system of a deep-sea mining apparatus for harvesting ore nodules, the collector system comprising:

a controller system;

a perception system communicatively coupled to the controller system configured to provide input data to the controller system from one or more cameras; and one or more robotic arms controlled via the controller system, wherein each of the one or more robotic arms is fitted with an end effector configured to collect one ore nodule at a time from a seabed, and wherein the perception system is configured to use computer vision segmentation and stereoscopic localization processes that account for refraction through air/glass and glass/water interfaces to identify ore nodules on the seabed based on whether macro fauna is present on the ore nodules so that the one or more robotic arms harvest ore nodules without macro fauna thereon.

2. The collector system of claim 1, wherein the one or more robotic arms are delta robots.

3. The collector system of claim 1, wherein the end effector is a claw or a universal gripper.

4. The collector system of claim 1, wherein the perception system is further configured to provide input data comprising at least a map of ore nodules lying on the seabed.

5. The collector system of claim 1, wherein the perception system is further configured to provide input data comprising a location of ore nodules with macro fauna and ore nodules without macro fauna.

6. The collector system of claim 1, wherein the one or more robotic arms move in six dimensions.

7. The collector system of claim 1, wherein the one or more robotic arms move in at least three dimensions.

8. The collector system of claim 1, wherein the one or more robotic arms comprise multiple kinematic chains or jointed arms connecting a fixed base to a movable triangular platform.

9. The collector system of claim 8, wherein the end effector is attached to a bottom end of the movable triangular platform.

10. The collector system of claim 8, wherein actuation of the kinematic chains or jointed arms is achieved via linear or rotational actuators.

11. The collector system of claim 8, wherein the kinematic chains or jointed arms are made from a composite material to reduce water drag during underwater movement of the one or more robotic arms.

12. The collector system of claim 1, wherein when the input data received by the controller system includes ore nodule macro fauna information, the controller system is configured to control the one or more robotic arms such that ore nodules with macro fauna are not harvested while ore nodules without macro fauna are harvested.

13. A deep-sea mining apparatus for harvesting ore nodules, comprising:

a buoyancy system;

a payload hopper;

an underwater autonomous vehicle (UAV); and a collector system comprising:

a controller system;

a perception system communicatively coupled to the controller system and configured to use computer vision segmentation and stereoscopic localization processes that account for refraction through air/glass and glass/water interfaces to track motion and identify nodules with macro fauna thereon for selective harvesting of ore nodules lying on a seabed; and one or more robotic arms controlled via the controller system, wherein each of the one or more robotic arms is attached to a bottom surface of the UAV and is equipped with a grasping mechanism configured to pick up ore nodules without macro fauna from the seabed.

14. The deep-sea mining apparatus of claim 13, wherein the one or more robotic arms comprise delta robots and the grasping mechanism is a universal gripper.

15. The deep-sea mining apparatus of claim 13, wherein the controller system is configured to control a movement of the one or more robotic arms so that the one or more robotic arms are harvesting ore nodules without macro fauna while avoiding ore nodules with macro fauna.

16. The deep-sea mining apparatus of claim 13, wherein the grasping mechanism is a universal gripper comprising a flexible waterproof bladder containing granules with a diameter of 1 mm dispensed in an incompressible liquid.

17. The deep-sea mining apparatus of claim 16, wherein the granules are steel ball bearings.

18. The deep-sea mining apparatus of claim 16, wherein the incompressible liquid is water or oil.

19. The deep-sea mining apparatus of claim 13, wherein the one or more robotic arms comprise delta robots and the grasping mechanism is a claw.

* * * * *